United States Patent Office 3,726,727
Patented Apr. 10, 1973

3,726,727
CHEMICAL WELDING MATERIAL
Wataru Ishibashi, 1563 Ichimiyake, Yasugun, Japan
Filed Jan. 15, 1971, Ser. No. 106,666
Claims priority, application Japan, May 19, 1970,
45/43,087
Int. Cl. C06b 19/00
U.S. Cl. 149—2                                                4 Claims

ABSTRACT OF THE DISCLOSURE

The invention provides a chemical welding composition material of a powdered light metal and a metal oxide molded under pressure into a solid form, thereby producing a material capable of providing concentrated heat to weld works quickly, and ensuring adaptability of the composition material for works difficult to weld, such as with deep holes, narrow curved parts, or lengthy workpieces, without need for special procedures or tools.

---

This invention relates to a chemical welding composition material which is formed by solidifying a mixture of powdered light metal and metal oxide in a mold under pressure.

More specifically, this invention is concerned with a chemical composition welding material which is formed under pressure into a solid form and comprises a thermite mixture of powdered light metal, selected from a group including Al, Mg, Be and Li, and a powdered metal oxide. Examples of typical prior art thermite compositions are well disclosed and taught by the Hoffman et al. Pat. 3,297,503 and the Allen Pat. 3,309,249. These latter patents teach that metals such as aluminum, magnesium, lithium, beryllium and boron may be employed in combination with an oxide of such metals as molybdenum, tungsten, manganese, vanadium and boron for the thermite reactions.

The purpose of this invention is to provide a welding composition material which is capable of welding workpieces of metal with an equal distribution and concentration of heat being produced through the reaction of a light metal, contained in the composition material, with oxygen when a metal oxide component is burned and reacted therewith, thereby ensuring the production of a uniform weld and a firm joint between the workpieces welded.

Among the known welding methods is thermite welding. This method employs a mixture called thermite, which is composed of powdered aluminum or a similar metal, and a black oxide of iron, i.e. $Fe_3O_4$. The mixture may be placed within a crucible and ignited by means of a piece of burning magnesium ribbon such that aluminum oxide and iron are formed by virtue of the following reaction:

$$3Fe_3O_4 + 8AL \rightarrow 4AL_2O_3 + 9Fe$$

A temperature of 2,500°–3,000° F. is produced by the above reaction and the molten iron collects at the bottom of the crucible while the molten aluminum oxide floats to the top. The joint of the workpieces to be welded is enclosed in a mold and heated to a weldable temperature. The molten iron from the crucible is then poured over the joint within the mold and caused to flow into the crevices of the joint, thereby creating a solid weld of metal. An alternative method of thermite welding is to sprinkle the powdered thermite mixture directly over the joint of the workpieces to be welded and igniting the mixture as previously described. The heat of the reaction will concurrently heat the workpieces as well as causing the molten iron to flow into the joint, thereby forming the weld. A mold may also be employed in this latter method for the purpose of enclosing and shaping the solidifying metal.

The known methods of thermite welding described above are capable of producing satisfactory weld joints only in cases wherein the workpieces are of regular or standard size and the joint area to be welded is small. For example, railroad rails and wheel axles. However, such methods are not successful for long or irregular shaped workpieces since it is not only difficult to achieve a uniform weld by sprinkling the thermite mixture over the length of a long or irregular joint, but it is also cumbersome to employ a crucible in combination with large molds for such joints. Additional expenditure of time is also necessary for the various process steps of equipping the mold, preheating the joint, waiting period before removal of the mold, etc. For example, the following data indicates the average time expenditure required for welding rails together by means of a standard, prior art thermite welding method not employing a crucible:

(a) Equipping of a sand mold around the joint
                                                    minutes__  2
(b) Preheating the joint _____do____      20
(c) Molding by ignition of thermite mixture
                                                   seconds__ 8 to 10
(d) Waiting for weld to solidify and cool
                                                    minutes__  5
(e) Removing of mold frame from joint
                                                    minutes__  1

Approximate total working time __do____  30

While the above method is simple and does not require any equipment, only requiring that the thermite mixture is sprinkled over the works and ignited, its main drawback is its powder mixture qulaity by which air is allowed to exist in the mixture thereby preventing the thermite reaction from spreading quickly, resulting in a reduction of welding efficiency. A further disadvantage involved in this method is the difficulty in charging the powdery thermite mixture in inaccessible curved and narrow workpieces, thereby causing undesirable discontinuities and bridges such that the thermite reaction is prevented from forming a continuous weld.

In order to overcome these drawbacks and disadvantages encountered in the prior art thermite welding methods, it has been discovered that heat energy produced through a thermite reaction per volume of thermite mixture and the effective amount of metal consumed in welding are proportional to the density of the thermite mixture itself. As such, the heat per volume of thermite is increased and the proportionate amount of metal consumed is greater when the welding material used is in a solid form as opposed to a mixture in powder form.

Based upon the above discovery, the present invention provides a chemical welding composition material of a powdered light metal and a metal oxide molded and solidified under pressure into a solid form. In another embodiment, the solid form may be packed within a metallic container to even further increase welding efficiency.

The invention will be described more particularly by way of an example using a thermite mixture of aluminum powder and iron oxide powder, with reference to the drawings, in which.

When a mixture of aluminum powder and iron oxide powder is used as a thermite welding composition, it is found that the heat energy per volume changes in accordance with the density of the material. This relationship is exemplified as follows:

| Density (g./cm.$^3$) | Energy to be produced (kcal./cm.$^3$) |
|---|---|
| 1.42 | 1.09 |
| 1.90 | 1.46 |
| 2.03 | 1.56 |
| 3.00 | 2.66 |
| 4.25 | 3.60 |

Figure 1:
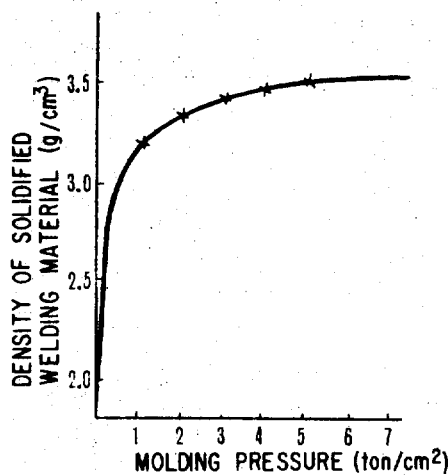
FIG. 1 is a graph showing the relationship between molding pressure applied to the thermite welding material and the resulting density of the solidified material.
Figure 2:
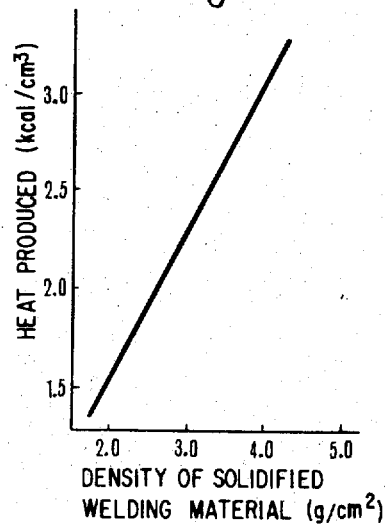
FIG. 2 is a graph showing the relationship between the density of the solidified welding material and the resulting heat produced therefrom.

From the above figures, it is evident that the welding material should be denser in order to increase energy, thereby increasing welding efficiency. FIG. 1 shows the relationship between the pressure applied in molding the material and the resulting density thereof. This relationship was derived from an example in which a mixture of average 80 micron aluminum grains and average 25 micron iron oxide grains in the proportion of 8 mole to 3 mole was molded under a pressure of from 1 to 6 ton/cm.$^3$, after which the density gradient begins to level off, and, when the pressure exceeds 5 ton/cm.$^2$, the relationship becomes exponential with no further increase in density. FIG. 2 shows that the heat energy increased linearly in proportion to the increase in density of the welding material.

Figure 3:
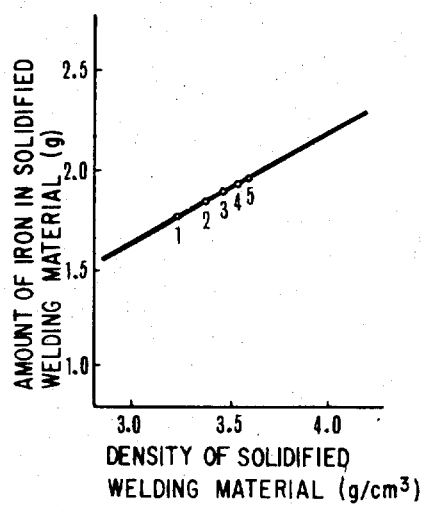
FIG. 3 is a graph showing the relationship between the density of the solidified material and the amount of iron contained per given volume.

It is evident from the foregoing that the welding metal contained per volume of welding material increases in an amount proportionate to its density. FIG. 3 depicts the relationship between the amount of iron contained per volume of solid welding material in accordance with the latter's density.

Figure 4:
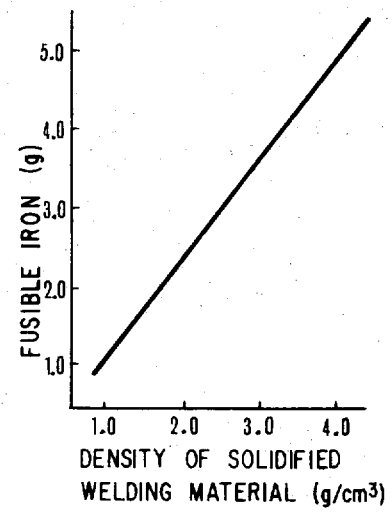
FIG. 4 is a graph showing the relationship between the density of the solidified material and the weight of iron on the workpieces to be welded by heat produced per given volume thereof.

When this solid welding material is used for welding, the estimated amount of iron to be fused onto the workpieces can be an index for measuring the welding efficiency. This is exemplified by FIG. 4 which depicts the relationship resulting from the measurement of the amount of iron fused by heat provided by each density increment of solid material. It is evident from this graph that 1.3 g. iron can be fused with a solid material of 1.0 g./cm.$^3$ density, and 5.5 g. iron can be fused with a solid material of 4.0 g./cm.$^3$ density. The relationship between the density of the solid material and the amount of iron to be fused is linear.

Figure 5:
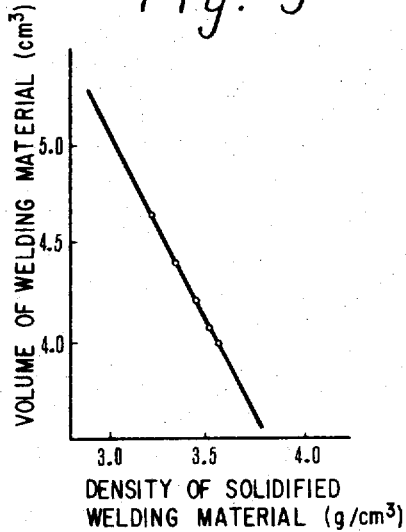
FIG. 5 is a graph showing the relationship between the density of the solidified material and the volume of the solidified material required to obtain a unit volume of weld.

According to the present invention, perfect welding can be achieved by employing a relatively small volume of welding material per volume of work when the former's density is high enough. An experiment has revealed that to produce a weld of 1 cm.$^3$ with the use of a solid material of 2.9 g./cm.$^3$ density, the volume of the material was necessarily 5.3 cm.$^3$, whereas when with the material of 3.8 g./cm.$^3$ density, the volume sufficiently reduces to 3.5 g./cm.$^3$. It therefore follows that a larger volume of welding material is required as per volume of work in accordance with decreases in its density. The results of this derived relationship is shown by FIG. 5 graph.

Thus, according to the present invention, the volume of welding material can be very small in relation to the volume of weld to be ultimately achieved. By using the thermite mixture in solid form, the chemical reaction is much smoother and more uniform, thereby producing a better concentration of heat and resulting in higher welding efficiency.

Figure 6:
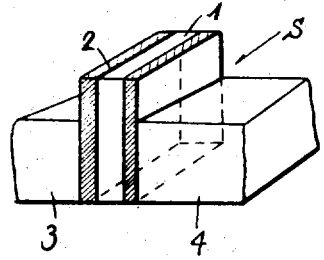
FIG. 6 is a schematic view showing an example of the welding composition material of this invention packed in a metallic container.
Figure 7:
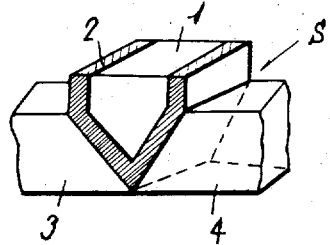
FIG. 7 is a schematic view showing a further embodiment of the example illustrated in FIG. 6.

Referring now to FIGS. 6 and 7, there are depicted examples of embodiments of the solidified thermite composition material of the present invention. The solidified thermite mixture 1, is molded under pressure into the basic desired shape. The molding procedures and apparatus employed are well known in the art, with the actual molding being carried out either at ambient or at a somewhat elevated temperature. In addition, a suitable synthetic or natural binder may also be employed to assist in maintaining the mixture together. The shape of the solidified material 1 can be in the form of the joint cavity of the workpieces to be welded together. FIGS. 6 and 7 depict the solidified material 1 packed within a metallic container 2 to form a welding unit assembly S. As can be seen, the outer configurations and dimensions of the unit S conform precisely to the internal cavity shape of the joint between the workpieces 3 and 4 to be welded together. The container 2 is open-ended, thereby permitting access for ignition of the solidified thermite material 1. Container 2 is made from a metal, such as iron, which actually takes part in the welding reaction inasmuch as it melts and forms an integral part of the weld joint. Because of the high heat produced from the solidified composition material of this invention, less thermite is required and the same results are produced by employing the container 2 as part of the actual weld metal. The container 2 can be made in a variety of shapes to conform to the requirements of the specific weld joints to be made.

In order to obtain optimum results, the following relationship should be taken into consideration:

$$b/a = 3.4$$

wherein $a$ is the thickness of the metallic container 2, and $b$ is the thickness of the thermite welding material 1 contained therein. This equation means that it is desirable for the thickness of the thermite welding material to be 3.4 times that of the container itself.

Also, another relationship to be observed is the following:

$$h/t = 1.9$$

where $h$ is the height of the welding material 1 contained within the joint and $t$ is the thickness of a metallic work 3 and 4 to be welded together. Thus, for optimum results the height of the solid thermite material should be 1.9 times that of the work to be welded.

Acording to the present invention, the solidified chemical welding material can burst into fire in an instant upon its local ignition by means of acetylene or propane gas at a temperature of about 650° C. with the result that the heat produced is more concentrated than when employing the prior art thermite welding material in powder form, though the average caloric values are not different between the two materials. As a result, welding efficiency highly increases, being free from undesirable bridges and discontinuities on the works, which would be unavoidable with the use of powder thermite mixtures provided by the prior art methods. In addition, according to the invention, the welding material can be solidified in various physical forms as desired, such as a pellet form, thereby enabling itself to be adapted to local welding in a deep hole or in narrow curved parts.

What is claimed is:

1. A welding article for welding a metallic workpiece joint cavity comprising:
   (a) a solidified mixture of a powdered light metal and a powdered metal oxide, and
   (b) an open-ended metallic container encasing the solidified mixture and having a configuration substantially conforming to the shape of the joint cavity to be welded wherein the ratio of the thickness of the solidified mixture to the thickness of the metallic container is approximately 3.4.

2. The welding article of claim 1 wherein the ratio of the thickness of the metallic workpiece to the height of the solidified mixture is approximately 1.9.

3. The welding composition material of claim 1 wherein said light metal is a metal selected from the group consisting of aluminum, magnesium, beryllium and lithium.

4. The welding composition material of claim 1 wherein said metal oxide is iron oxide.

References Cited

UNITED STATES PATENTS

| | | | |
|---|---|---|---|
| 3,020,610 | 2/1962 | Rejdak | 149—37 X |
| 3,089,798 | 5/1963 | Rejdak | 149—37 |
| 3,160,537 | 12/1964 | Trafton | 149—37 |
| 3,168,090 | 2/1965 | Billhardt | 149—37 X |
| 3,259,972 | 7/1966 | Long | 149—37 X |
| 3,297,503 | 1/1967 | Hoffmann et al. | 149—37 X |
| 3,325,316 | 6/1967 | MacDonald | 149—37 X |
| 3,344,210 | 9/1967 | Silvia | 149—37 X |
| 3,461,270 | 8/1969 | Patton | 148—24 X |
| 3,488,469 | 1/1970 | Buss | 148—24 X |
| 3,253,120 | 5/1966 | Claussen | 148—24 X |

STEPHEN J. LECHERT, JR., Primary Examiner

U.S. Cl. X.R.

149—37; 148—24, 26